(12) United States Patent
Van Dorpe et al.

(10) Patent No.: US 12,251,918 B2
(45) Date of Patent: Mar. 18, 2025

(54) METHOD OF MANUFACTURING DECORATIVE PANELS

(71) Applicant: AGFA NV, Mortsel (BE)

(72) Inventors: Jurgen Van Dorpe, Mortsel (BE); Patrick Van Mooter, Mortsel (BE); Paul Wouters, Mortsel (BE); Christof Baks, Mortsel (BE)

(73) Assignee: Agfa NV, Mortsel (BE)

( * ) Notice: Subject to any disclaimer, the term of this patent is extended or adjusted under 35 U.S.C. 154(b) by 155 days.

(21) Appl. No.: 18/249,413

(22) PCT Filed: Oct. 13, 2021

(86) PCT No.: PCT/EP2021/078298
§ 371 (c)(1),
(2) Date: Apr. 18, 2023

(87) PCT Pub. No.: WO2022/084120
PCT Pub. Date: Apr. 28, 2022

(65) Prior Publication Data
US 2023/0391065 A1    Dec. 7, 2023

(30) Foreign Application Priority Data
Oct. 19, 2020   (EP) ..................................... 20202554

(51) Int. Cl.
*B32B 38/00*       (2006.01)
*B32B 21/02*       (2006.01)
(Continued)

(52) U.S. Cl.
CPC .......... *B32B 38/1875* (2013.01); *B32B 21/02* (2013.01); *B32B 21/06* (2013.01);
(Continued)

(58) Field of Classification Search
None
See application file for complete search history.

(56) References Cited

U.S. PATENT DOCUMENTS

2019/0217524 A1    7/2019   Liou et al.

FOREIGN PATENT DOCUMENTS

| EP | 2905145 B1 | 10/2019 |
| JP | 2010-042898 A | 2/2010 |
| KR | 10-1771585 B1 | 9/2017 |

OTHER PUBLICATIONS

Eranpurwala, "Hymmen Digital Décor Printing: Empowering the Laminate Industry," *Handbook of Industrial Inkjet Printing: A Full System Approach*, First Edition, Wiley-VCH Verlag Gmbh & Co. KGaA, Chapter 48, pp. 817-832 (2018).
(Continued)

*Primary Examiner* — Barbara J Musser
(74) *Attorney, Agent, or Firm* — Leydig, Voit & Mayer, Ltd.

(57) ABSTRACT

Manufacturing decorative panels by using a web-fed inkjet printer. During the feeding of the to-be-printed substrate, the tension of the substrate is controlled by a dancer unit (720) which includes a dancer roll (200), having a connector (120) on both side ends of said roll, and wherein both connectors (120) are connected to a pair of parallel guiders (110) for floating said roll along a floating path (210); and wherein the step of controlling comprises the step of moving one guider (110) of said pair of guiders (110) parallel to said floating path (210) whereby the dancer roll (200) is tilted.

16 Claims, 4 Drawing Sheets

(51) Int. Cl.
*B32B 21/06* (2006.01)
*B32B 27/08* (2006.01)
*B32B 27/30* (2006.01)
*B32B 27/40* (2006.01)
*B32B 37/24* (2006.01)
*B32B 38/08* (2006.01)
*B32B 41/00* (2006.01)
*B41J 15/16* (2006.01)
*B65H 23/04* (2006.01)

(52) U.S. Cl.
CPC .............. *B32B 27/08* (2013.01); *B32B 27/30* (2013.01); *B32B 27/40* (2013.01); *B32B 37/24* (2013.01); *B32B 38/08* (2013.01); *B32B 38/145* (2013.01); *B32B 41/00* (2013.01); *B41J 15/165* (2013.01); *B65H 23/048* (2013.01); *B32B 2037/243* (2013.01); *B32B 2255/10* (2013.01); *B32B 2255/26* (2013.01); *B32B 2260/028* (2013.01); *B32B 2260/046* (2013.01); *B32B 2305/07* (2013.01); *B32B 2307/4023* (2013.01); *B32B 2307/718* (2013.01); *B32B 2317/125* (2013.01); *B32B 2317/16* (2013.01); *B32B 2329/00* (2013.01); *B32B 2607/00* (2013.01); *B65H 2301/5114* (2013.01); *B65H 2404/1526* (2013.01); *B65H 2701/1922* (2013.01)

(56) References Cited

OTHER PUBLICATIONS

Lutz, "Industrial Inkjet Printing in Decorative Web Print Applications," *Handbook of Industrial Inkjet Printing: A Full System Approach*, First Edition, Wiley-VCH Verlag Gmbh & Co. KGaA, Chapter 44, pp. 747-759 (2018).

European Patent Office, International Search Report in International Patent Application No. PCT/EP2021/078298, mailed Jan. 28, 2022, 3 pp.

European Patent Office, Written Opinion in International Patent Application No. PCT/EP2021/078298, mailed Jan. 28, 2022, 5 pp.

METHOD OF MANUFACTURING DECORATIVE PANELS

CROSS-REFERENCE TO RELATED APPLICATIONS

This patent application is the U.S. national stage of copending International Patent Application No. PCT/EP2021/078298, filed Oct. 13, 2021, which claims the benefit of European Patent Application No. 20202554.0, filed Oct. 19, 2020.

TECHNICAL FIELD

The present invention is related to the manufacturing of decorative panels wherein a decorative image, such as a wood pattern, is printed by a web-fed inkjet print system while feeding a substrate to form a decoration layer which is than pressed together with one or more other layers to a decorative panel; which may be cut into a plurality of decorative laminates used as decorative flooring, decorative wall elements . . . .

BACKGROUND ART

Gravure, offset and flexography are being increasingly replaced for different applications by industrial inkjet printing systems, which have now proven their flexibility in use, such as variable data printing, making short production runs and personalized products possible, and their enhanced reliability, allowing incorporation into production lines, also called manufacturing lines.

Inkjet technology has also been implemented in manufacturing lines for decorative panels. A historical overview and dedicated case studies of a web-fed inkjet print system for printing decorative images on deco-paper to manufacture decorative panels, are disclosed in Chapter 44 "Industrial Inkjet Printing in Decorative Web Print Applications" by Pair& Lutz and Chapter 48 "Hymmen Digital Décor Printing: Empowering the Laminate Industry by Aliasgar Eranpurwala in "Handbook of Industrial Inkjet Printing: A Full System Approach", edited by Werner Zapka (publisher Wiley-VCH Verlag GmbH & Co, 22 Nov. 2017, 984 pages).

Not only single-pass inkjet printers also multi-pass inkjet printers are used as web-fed inkjet print system in the manufacturing of decorative panels. A multi-pass inkjet print system is for example disclosed in the following published European patent application EP2905145 A1 (UNILIN BVBA) wherein in paragraph a multi-pass inkjet system is disclosed for the manufacturing of decorative panels. Examples of such inkjet print systems are the pioneer the ●Factory™ from AGFA™ with CMYK inkjet inks, later the Digital Printing Line JPT-W from Hymmen™ and the RotaJET™ 225 from Koenig & Bauer™ which are all used to be part of a manufacturing line of decorative panels.

A big issue is that a thin web-substrate, whereon the decoration layer is printed, is used in the manufacturing of decorative panels. In the feeding of said thin web-substrate easily wrinkles are formed in a web-fed inkjet printer which result in badly printed decoration layers. Also small wrinkles, not visible in the fed web-substrate and printed web-substrate result in delamination of the decorative panels which includes said decorative layer on invisible wrinkled substrate.

Said rolls are mostly of the time pre-treated off-line e.g. by applying a coating or ink receiver layer or cut from a master roll before entering the web-fed inkjet printer. Due unwinding, (re)winding, cutting during said off-line process to a roll of web-substrate which is made print-ready for the web-fed inkjet printer results in differences of tensions within said roll and also differences of tensions between 'print-ready' rolls of web-substrate (300), even they are made by the same material. The operator of the web-fed inkjet printer needs means for controlling, anticipating, maintaining said changing tension inside a roll and between rolls.

SUMMARY OF INVENTION

In order to overcome the problems described above, preferred embodiments of the present invention have been realised with a method of manufacturing decorative surfaces as defined by claim 1.

Hereby the web-substrate (300) is fed in the web-fed inkjet printer without wrinkles and the tension can be controlled fast and anticipated fast if there are differences in tensions within a roll of web-substrate, as input roll (150), or in tensions within different rolls of web-substrate (150), as input rolls (150). Said tensions may be measured along the feeding path (155).

DESCRIPTION OF EMBODIMENTS

Web-Fed Inkjet Printing System

Figure 1:
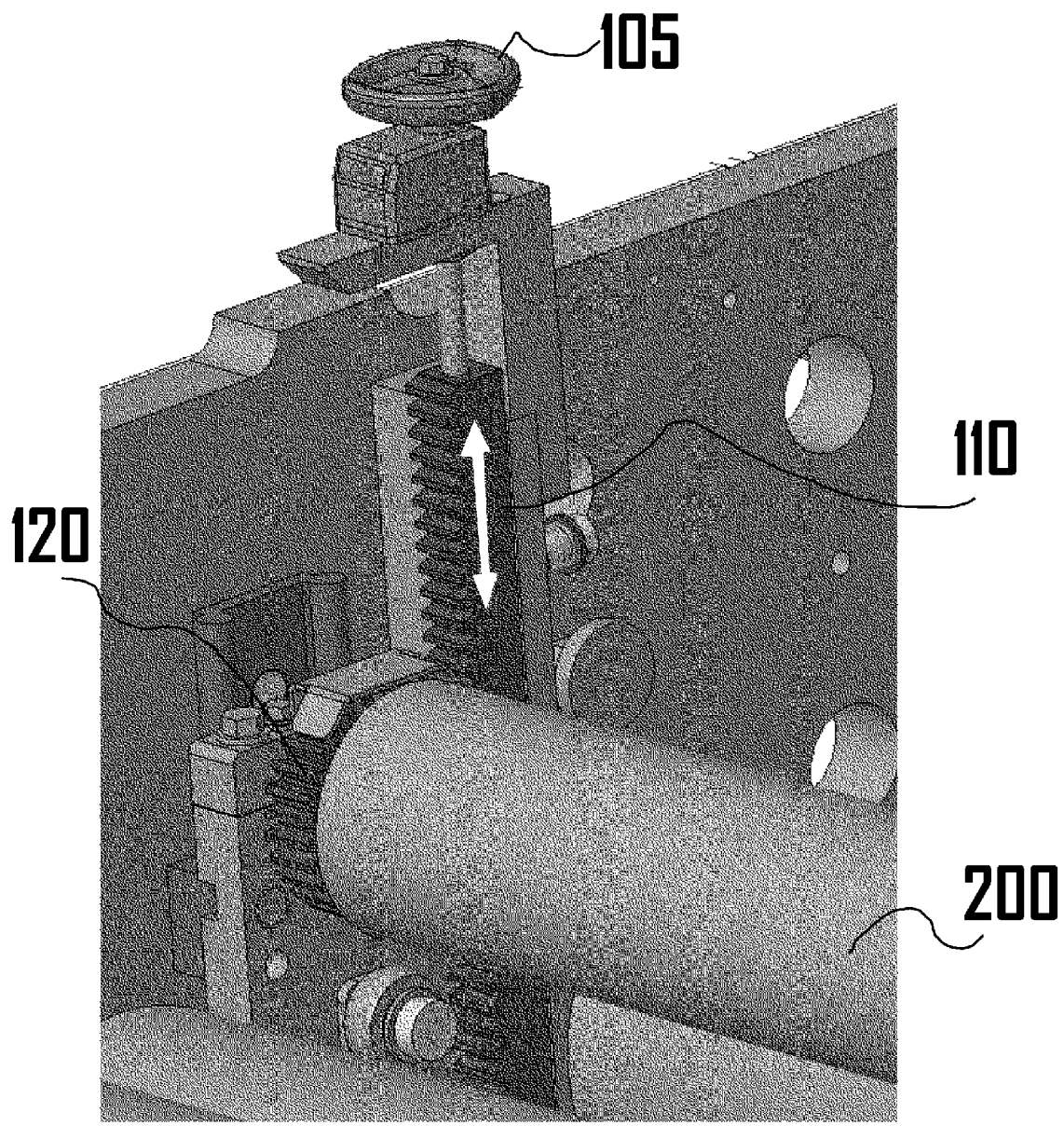
FIG. 1 and FIG. 2 illustrates the same dancer unit of a preferred embodiment but in close-up.

The web-fed inkjet print system comprises means for transporting web-substrates whereon, with one or more inkjet printheads, a decoration layer (500) is printed. The one or more inkjet printheads are preferably comprised in an inkjet printhead unit (400) and more preferably comprises an inkjet ink set for printing a colored decoration layer (500), which represents preferably an oligochromatic image, more preferably a wood pattern. The web-fed inkjet print system comprise means for transporting one or more web-substrates.

A roll comprising a web-substrate (300) are mounted on a web supply which implements one or more spindles. The spindles are rotated by distributing torque from the drive shaft by a drive mechanism. The spindles are co-axial spindles used for holding the rolls comprising the web-substrates. Spindels are also called shafts. Goldenrod™ Corporation provides such equipment for winding and unwinding substrates on/from roll. Such shaft and roll handling are well-known in the state-of-the-art.

The web-fed inkjet print system preferably comprises drying devices for the drying of inkjet printed decoration layer (500). The drying device, such as radiation curing device or infra-red dryer, depends on the type of ink-set that is used in the web-fed inkjet print system.

The transport of the decoration layers (500) to a press, preferably a heat press, after the forming of the assembly of layers may be performed by one or more joining stations and/or one or more transport tables and/or one or more conveyor modules up to the assigned press. After the pressing the decorative panel may be supplied to a stacking area.

The web-fed inkjet print system preferably comprises web guide and/or a web-substrate (300) spreading device for providing a straight transport underneath the plurality of inkjet print heads. Wobbling, web swimming of the web-substrate (300) may give color deviations in the decoration layer (500) due to bad color-on-color registration.

The web-fed inkjet print system comprises a print table for supporting the web-substrates without crinkles underneath the inkjet print head unit. The print table may be a vacuum table for a better holding of the web-substrate (300) while printing in a multi-pass web-fed inkjet print system. The print table may also be a conveyor belt whereby the web-substrates are supported and preferably hold down by vacuum. When vacuum power is used for holding down the web-substrate (300) than the conveyor belt is also called a vacuum belt. The principles of conveyor belt, vacuum belt, print table, vacuum table is known by the skilled person.

The web-fed inkjet printer may be a single-pass inkjet printer but preferably a multi-pass inkjet printer.

The web-fed inkjet printer has preferably an input zone (710) with an input roll (150); a dancer unit (720); a printing zone (730) with an inkjet printhead unit (400) and an output zone (740) with an output roll (250).

A) Dancer Unit

In the present embodiment there is a dancer unit (720) within the feeding path (155) of the web-substrate (300). The dancer unit (720) controls and maintains the tension of said substrate for avoiding one or more wrinkles in said substrate. Such a dancer unit (720); wherein said controlling step is performed by a dancer unit (720) within the feeding path (155), wherein said dancer unit (720) includes a dancer roll (200), having a shaft which is positioned parallel to a first direction, which is lateral of said fed substrate; and having a connector (120) on both side ends of said shaft wherein both connectors (120) are connected to a pair of parallel guiders (110) for floating said roll along a floating path (210) which is perpendicular to said first direction.

The dancer unit may comprise other rolls (205) to guide the web-substrate (300) through said dancer unit.

The maximum diameter of the dancer roll (200) is preferably between 10 mm and 500 mm, more preferably said diameter is smaller at the side edges of the dancer roll (200) than in the middle of the dancer roll (200) for having a web spreading effect.

In the present embodiment one of the guiders (110) of said pair of guiders (110) is capable of moving parallel to the floating path (210) which is perpendicular to said first direction whereby the shaft is tilted at the side end which has the connector (120) connected to said moving guider (110). Said movement is possible while feeding the web-substrate (300) through the web-fed inkjet printer. Hereby the tension at the edges of the web-substrate (300) is more controlled and no wrinkles occur while feeding the web-substrate (300). The dancer roll (200) is hereby forced to be angled (=tilted at one side; not horizontal) while floating in the floating path (210). Due said floating and tilting at one side of the shaft a better solution is found then tilting at one side a nip roll in the feeding path (155) or a roll in the dancer unit (720) wherein said roll is not a dancing roll. Especially when the web-fed inkjet printer is a multi-pass inkjet printer wherein the feeding of the web-substrate (300) is with successive distance movements.

Due said possibility to move one of said guiders (110) during feeding wrinkles can be avoided even they are small and not noticeable. Due said wrinkles it is notified that inside the decoration panel the layers from pressed assembly of layers are delaminating which lowers the quality of the manufactured decoration panel. Therefor any wrinkles, cracks, folds in the web-substrate (300) prior or after printing the decoration layer (500) have to be avoided. The present embodiment solves this very efficient.

Said tilting at one side is preferably limited to a distance of 4 times a diameter of the dancer roll (200), wherein said diameter is measured in the middle of the shaft.

Figure 2:
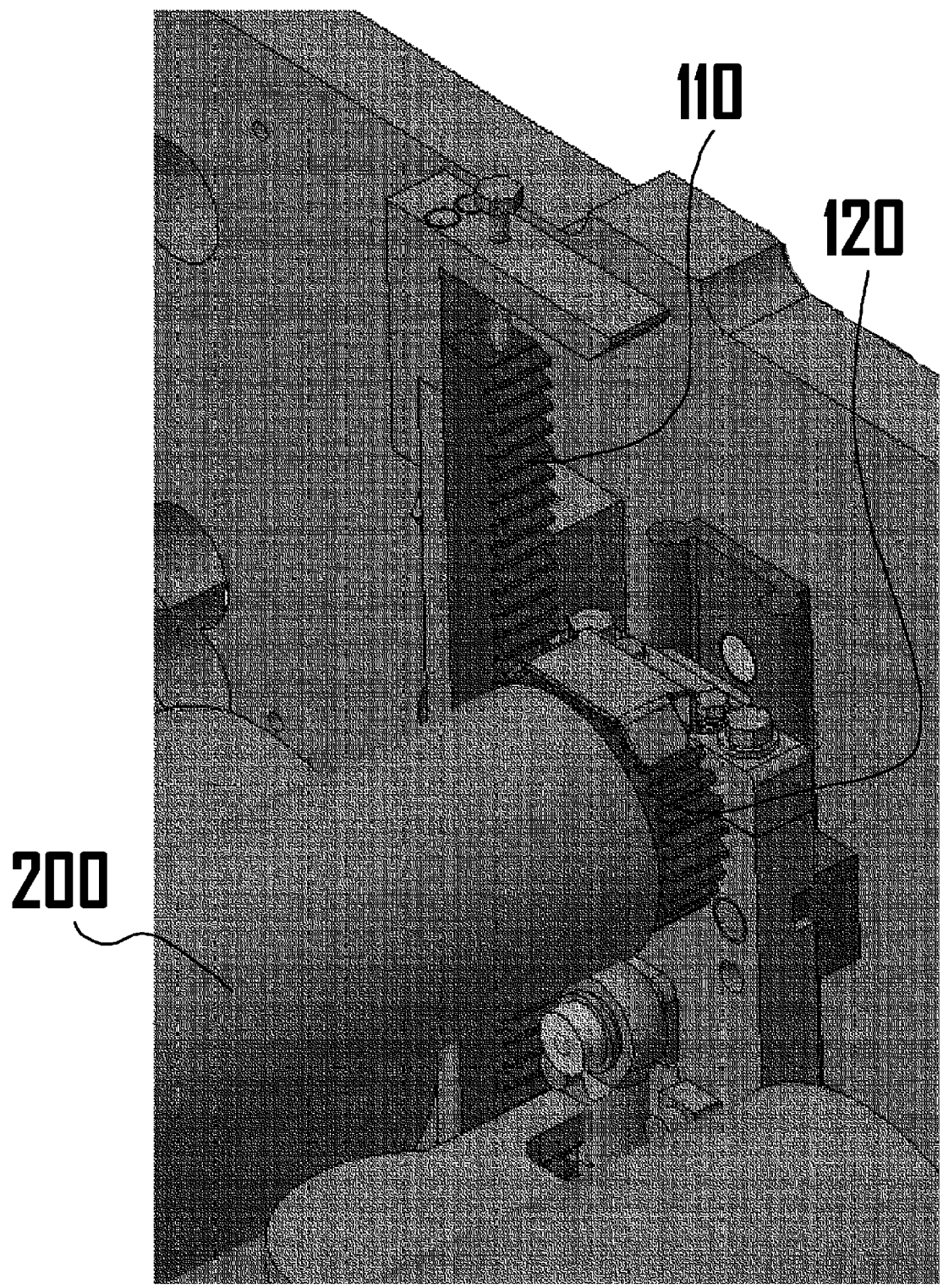
Figure 3:
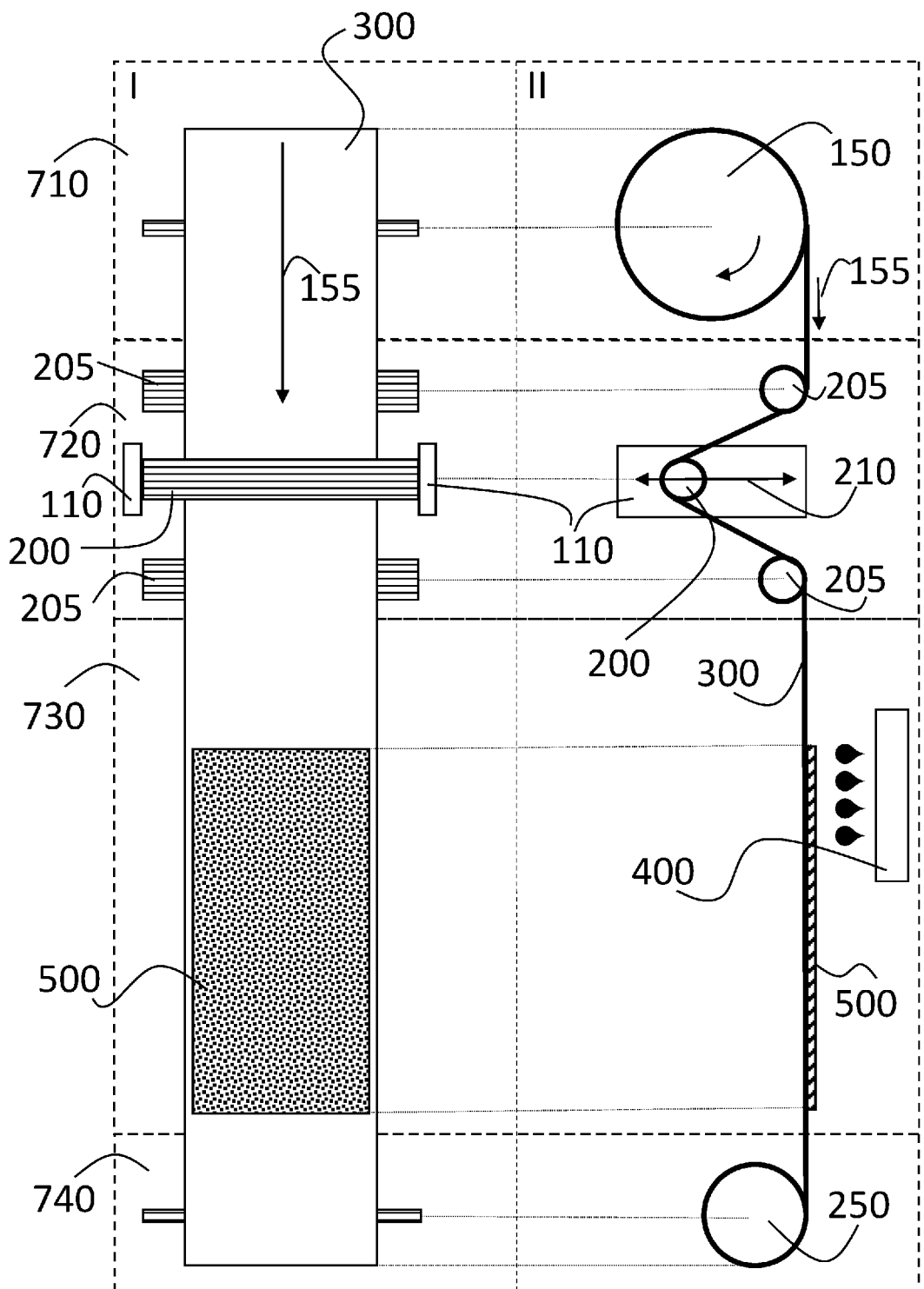
FIG. 3 illustrates a web-fed inkjet printer of a preferred embodiment. Roman number I illustrates a top view of said web-fed inkjet printer and roman number II illustrates a cross cut of said web-fed inkjet printer.

In a specific preferred embodiment each connector (120) is a gear and the pair of parallel guiders (110) is a pair of gear racks (see FIG. 1 and FIG. 2).

During the feeding of the web-substrate (300), the web-substrate (300) may be sensed at an edge of the web-substrate (300) to determine the tension at said edge where after the guider (110) is moved according said determination to control and to maintain the tension of the web-substrate (300). Said sensing is preferably by a non-contact method such as image capturing the edge, wherefrom the waviness of the edge can be determined which determines the tension at said edge.

The dancer unit (720) is preferably located between
an input roll (150) wherefrom the web-substrate (300) is fed; and a printing area of the web-fed inkjet printer where the decoration layer (500) is printed. In a preferred embodiment the thickness of said input roll (150) is determined during the feeding where after the guider (110) is moved according said determination.

Humidity in the web-substrate (300) may also cause loosing tension inside the web-substrate (300), the operator can control this also with said movement of said guider (110). The humidity in a web-substrate (300) may not be uniform and may be different between several 'print-ready' roll of web-substrates.

The web-fed inkjet printer may also comprise one or more heated rolls or dehumidifier means along the feeding path (155), which may be implemented at the dancer unit (720). Also the dancer roll (200) in the dancer unit (720) may be heated. The temperature is then preferably between 40 and 70° C. If the web-substrate (300) is a thermoplastic then temperature is then preferably between 40 and 60° C. to avoid dimensional changes of the web-substrate (300).

FIG. 1 and FIG. 2 illustrates a dancer unit (720), configured in a Jeti TAURO™ H2500 of AGFA NV. The dancer unit (720) may be part of a preferred embodiment of the present invention and comprises a dancer roll (200) which has at its both end sides a connector (120) connected to a guider (110). FIG. 1 is a close-up at the left side of said dancer roll (200) wherein the guider (110) is configured movable up and down (indicated by the white arrow) by turning a spindle with handlebar (105) clock wise and anti-clock wise and FIG. 2 is a close-up at the right side of said dancer roll (200) wherein the guider (110) is not movable. By moving the guider (110) as illustrated in FIG. 1 at the left side of the dancer roll (200); the dancer roll (200) can be tilted. Both guiders (110) forming a pair of guiders which are parallel to each other. The connectors (120) left and right are here illustrated as gears and the guiders (110) left and right are here illustrated as gear racks.

Figure 4:
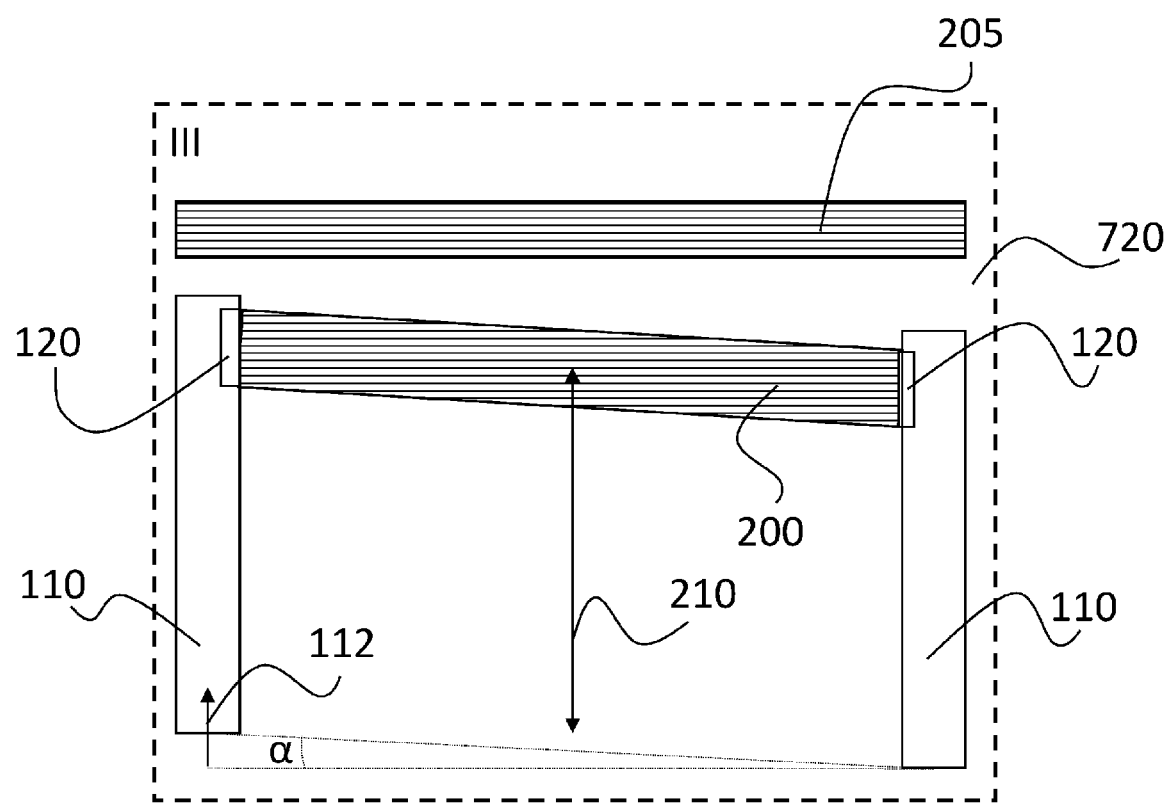
FIG. 4 illustrates a dancer unit (720) of a preferred embodiment. Roman number III illustrates a front view of said dancer unit (720). There were a web-substrate (300) enters the dancer unit (720).

FIG. 4 illustrates also a dancer unit (720) in front view. There were the web-substrate enters from an input zone (not visible) to said dancer unit (720) over a roll 205 which guides the web-substrate; under a dancer roll (200) and back over another roll which is not illustrated wherefrom it is further fed towards a print zone (not visible). The dancer roll (200) is tilted at one side with an angle α by a movement (115) of one of the guiders (110) on which the dancer roll (200) is connected and is able to float along the floating path (210). In a preferred embodiment said angle is between 0.05 and 15 degrees. The angle may not be that large to avoid disconnection of the dancer roll (200) from the pair of guiders (110).

Flooring Panels: Vinyl Tile and Vinyl Strips and Vinyl Roll

In a preferred embodiment is the decorative panel selected from the group consisting of kitchen panel, flooring panel, furniture panel, ceiling panels and wall panels wherein the flooring panel preferably is selected from the group consisting of vinyl tile and vinyl strips and vinyl roll; and wherein the assembly of layers comprises the decoration layer (500) and one or more thermoplastic foils. A possible production process is disclosed in WO2016188743 A1 (AGFA NV). Said one or more thermoplastic foils may be a polyvinyl chloride foil.

Herein is the web-substrate (300) preferably a thermoplastic foil, more preferably a polyvinyl chloride foil. The assembly of layers may also comprise a protective layer and preferably a polyurethane finishing layer on top of said protective layer.

For having a good image quality of the decoration layer (500), the decoration layer (500) is preferably formed by droplets from a free radical UV curable inkjet ink set; and wherein the decoration layer (500) is at least partially UV cured on the web-substrate (300) prior the forming of the assembly of layers. In a preferred embodiment is the decoration layer (500) cured using UV LEDs.

To enhance the flexibility of the decorative panel one of the thermoplastic foils within the assembly of layers is coated with a layer containing vinylchloride-vinylacetate-vinylalcohol.

For better bonding of the layers in the assembly of layers the pressing step may be a heat pressing step.

Flooring Panels with Core Layer: MDF, HDF and OSB

In a preferred embodiment is the decorative panel is selected from the group consisting of kitchen panel, flooring panel, furniture panel, ceiling panels and wall panels; and
  wherein the assembly of layers comprises the decoration layer (500) and one or more layers selected from the group consisting of a balancing layer, paper layer, resin-impregnated paper layer, protective layer, and a core layer preferably selected from the group of MDF (=Medium Density Fibreboard), HDF (High Density Fibreboard) and OSB (=Oriented Strand Board); and
  wherein, before forming the assembly of layers, the printed decoration layer (500) is resin-impregnated with a thermosetting resin preferably selected from the group consisting of melamine-formaldehyde based resins, ureum-formaldehyde based resins and phenol-formaldehyde based resins;
  wherein the pressing-step is a heat-pressing step. Said preferred embodiment may hereby be part of a CPL (Compact Laminate) or an HPL (High Pressure Laminate) process.

The web-substrate (300) is then preferably a paper and more preferably a paper with a porosity according to Gurley's method (DIN 53120) between 8 and 35 seconds and a weight between 35 and 160 g/m².

The decoration layer (500) is then preferably formed by droplets from an aqueous pigmented inkjet ink set which preferably comprises a cyan (C) ink, magenta (M) or red (R) ink, a yellow (Y) ink and a black (K) ink. The ink set may also comprise diluted inks such as light cyan ink, light black ink or light magenta ink.

The web-substrate (300) is preferably coated by one or more inkjet receiver layers, prior the feeding of the web-substrate (300) in the web-fed inkjet printer.

A) Core Layer

Chipboard, plywood or even solid wood may also be used as core layer. But solid wood is here for less preferred because this may shrink and cause undulations to appear on the surface of the decorative panel. Chipboards and plywood is more preferred especially for specific decorative panel requirements such as: stability, flatness, rigidity, mechanical properties, uniformity of thickness, water and humidity resistance and fire performance properties.

A core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, e.g. as described in U.S. Pat. No. 4,952,277 (BET PAPERCHEM). A core layer may also be impregnated by a resin, more preferably a thermosetting resin.

In another preferred embodiment, the core layer is a board material composed substantially of wood fibres, which are bonded by means of a polycondensation glue, wherein the polycondensation glue forms 5 to 20 percent by weight of the board material and the wood fibres are obtained for at least 40 percent by weight from recycled wood.

Instead of a wood based core layer, also a synthetic core layer may be used. In a preferred embodiment, the core layer comprises a foamed synthetic material, such as foamed polyethylene or foamed polyvinyl chloride.

The thickness of the core layer is preferably between 2 and 12 mm, more preferably between 5 and 10 mm.

B) Ink Receiving Layer

One or more ink receiving layers may be present on the web-substrate (300) of the decoration layer (500) for enhancing the image quality.

It is found that the application of one or more ink receiving layers on the web-substrate (300) influences the tension within said substrate, certainly at the edges of said substrate. Therefor the present embodiment is a great solution to avoid wrinkles caused by the different tensions within said substrate. Said application is mostly done offline so the web-substrate (300) is unwinded, coated with said one or more ink receiving layers and then winded before entering the web-fed inkjet printing. Said unwinding-winding process causes also different tensions in said substrate and differences in tensions between rolls of said substrate.

The ink receiving layer(s) may be a purely polymer based ink receiving layer, but preferably contain an inorganic pigment and a polymeric binder. The inorganic pigment may be a single type of inorganic pigment or a plurality of different inorganic pigments. The polymeric binder may be a single type of polymeric binder or a plurality of different polymeric binders.

In a preferred embodiment, the ink receiving layer(s) have a total dry weight between 2.0 g/m² and 10.0 g/m², more preferably between 3.0 and 6.0 g/m².

In a particularly preferred embodiment, the ink receiving layer(s) include a polymeric binder, preferably a water soluble polymeric binder (>1 g/L water at 25° C.), which has a hydroxyl group as a hydrophilic structural unit, e.g. a polyvinyl alcohol.

The inorganic pigment is preferably selected from the group consisting of alumina hydrates, aluminum oxides, aluminum hydroxides, aluminum silicates, and silicas.

The ink receiving layer(s) may consist of a single layer or of two, three or more layers even having a different composition. The ink receiving layer(s) may be coated onto the support side of the substrate by any conventional coating technique, such as dip coating, knife coating, extrusion coating, spin coating, slide hopper coating and curtain coating. Alternatively, the ink receiving layer(s) can also be applied by a printing technique, such as flexographic printing, screen printing and inkjet printing technology such as valvejet printheads.

Relief Matching

The top surface of the assembly of layers is preferably provided with a relief which matches the decoration layer (500), such as for example a representation of a wood pattern having a wood grain, cracks and knots in a woodprint. Embossing techniques to accomplish such relief are well-known in the art of flooring panels as disclosed by, for example, EP 1290290 A (FLOORING IND), US 2006144004 (UNILIN), EP 1711353 A (FLOORING IND) and US 2010192793 (FLOORING IND). Most preferably the relief is formed by pressing a digital embossing plate, cylinder or belt against said top surface of the assembly of layers. This may be performed in the pressing-step of the present embodiment wherein the layers of said assembly of layers are bounded. Said pressing step is preferably a heat-pressing step.

The invention claimed is:

1. A method of manufacturing decorative panels, the method comprising:
    feeding a web-substrate along a feeding path in a web-fed inkjet printer;
    printing a decoration layer on said substrate by said printer;
    forming an assembly of layers by applying one or more other layers on said printed substrate and/or applying said printed substrate on one or more other layers;
    pressing said assembly for bounding the layers of said assembly to form a decorative panel; and
    during the feeding, controlling tension of said substrate for avoiding one or more wrinkles in said substrate; wherein said controlling step is performed by a dancer unit within the feeding path, wherein said dancer unit includes a dancer roll, having
    a shaft which is positioned parallel to a first direction, which is transverse of said fed substrate; and
    having a connector on both side ends of said shaft wherein both connectors are connected to a pair of parallel guiders for floating said roll along a floating path which is perpendicular to said first direction; and
    wherein the step of controlling comprises:
    moving one guider of said pair of guiders parallel to said floating path for tilting said shaft where said shaft is connected to said moving guider.

2. The method of claim 1, wherein the decorative panel is selected from the group consisting of kitchen panel, flooring panel, furniture panel, ceiling panels, and wall panels;
    wherein the assembly of layers comprises the decoration layer and one or more layers selected from the group consisting of a balancing layer, paper layer, resin-impregnated paper layer, protective layer, and a core layer selected from MDF, HDF, and OSB;
    wherein, before forming the assembly of layers, the printed decoration layer is resin-impregnated with a thermosetting resin selected from the group consisting of melamine-formaldehyde based resins, urea-formaldehyde based resins and phenol-formaldehyde based resins; and
    wherein the pressing-step is a heat-pressing step.

3. The method of claim 2, wherein the web-substrate is a paper with a porosity according to Gurley's method using DIN 53120 between 8 and 20 seconds and a weight between 40 and 150 g/m$^2$.

4. The method of claim 3, wherein the decoration layer is formed by droplets from an aqueous pigmented inkjet ink set.

5. The method of claim 4, wherein the web-substrate is coated by one or more inkjet receiver layers, prior the feeding of the web-substrate in the web-fed inkjet printer.

6. The method of claim 1, wherein the decorative panel is selected from the group consisting of kitchen panel, flooring panel, furniture panel, ceiling panels, and wall panels;
    wherein the assembly of layers comprises the decoration layer and one or more thermoplastic foils.

7. The method of claim 6, wherein the web-substrate is a thermoplastic foil.

8. The method of claim 7, wherein the decoration layer is formed by droplets from a free radical UV curable inkjet ink set and wherein the decoration layer is at least partially UV cured on the web-substrate prior the forming of the assembly of layers.

9. The method of claim 8, wherein one of the thermoplastic foils within the assembly of layers is coated with a layer containing vinylchloride-vinylacetate-vinylalcohol.

10. The method of claim 1, wherein the moving of the guider is limited to a distance of 4 times a diameter of the dancer roll, wherein said diameter is measured in the middle of the shaft.

11. The method of claim 10, wherein the diameter is larger than a diameter of the dancer roll at the side edges of the shaft.

12. The method of claim 1, wherein an edge of the web-substrate is sensed during the feeding to determine the tension at said edge and where after the guider is moved according to said determination.

13. The method of claim 1, wherein the dancer unit is located between
    an input roll wherefrom the web-substrate is fed; and
    a printing area of the web-fed inkjet printer where the decoration layer is printed; and
    whereby the thickness of the input roll is determined during the feeding where after the guider is moved according to said determination.

14. The method of claim 1, wherein each connector is a gear and the pair of parallel guiders is a pair of gear racks.

15. The method of claim 1, wherein the web-fed inkjet printer is a multi-pass inkjet printer.

16. The method of claim 1, wherein the decorative panel is flooring panel, wherein the flooring panel is selected from the group consisting of vinyl tile, vinyl strips, and vinyl roll; and
    wherein the assembly of layers comprises the decoration layer and one or more thermoplastic foils.

* * * * *